(12) United States Patent
Perfettini et al.

(10) Patent No.: US 12,514,902 B2
(45) Date of Patent: Jan. 6, 2026

(54) P21 EXPRESSING MONOCYTES FOR CANCER CELL THERAPY

(71) Applicant: Institut Gustave-Roussy, Villejuif (FR)

(72) Inventors: Jean-Luc Perfettini, Meaux (FR); Awatef Allouch, Bry sur Marne (FR); Eric Deutsch, Paris (FR)

(73) Assignee: Institut Gustave-Roussy, Villejuif (FR)

(*) Notice: Subject to any disclaimer, the term of this patent is extended or adjusted under 35 U.S.C. 154(b) by 993 days.

(21) Appl. No.: 17/626,360

(22) PCT Filed: Jul. 17, 2020

(86) PCT No.: PCT/EP2020/070379
§ 371 (c)(1),
(2) Date: Jan. 11, 2022

(87) PCT Pub. No.: WO2021/013764
PCT Pub. Date: Jan. 28, 2021

(65) Prior Publication Data
US 2022/0257709 A1 Aug. 18, 2022

(30) Foreign Application Priority Data
Jul. 19, 2019 (EP) .................................. 19305963

(51) Int. Cl.
| | |
|---|---|
| *A61K 40/17* | (2025.01) |
| *A61K 38/17* | (2006.01) |
| *A61K 40/11* | (2025.01) |
| *A61K 40/24* | (2025.01) |
| *A61K 40/42* | (2025.01) |
| *A61K 40/46* | (2025.01) |
| *A61K 45/06* | (2006.01) |
| *A61P 35/02* | (2006.01) |
| *C12N 5/0786* | (2010.01) |
| *C12N 15/63* | (2006.01) |
| *C12N 15/86* | (2006.01) |
| *C12N 15/90* | (2006.01) |

(52) U.S. Cl.
CPC .......... *A61K 38/1709* (2013.01); *A61K 40/11* (2025.01); *A61K 40/17* (2025.01); *A61K 40/24* (2025.01); *A61K 40/42* (2025.01); *A61K 40/46* (2025.01); *A61K 45/06* (2013.01); *A61P 35/02* (2018.01); *C12N 5/0645* (2013.01); *C12N 15/86* (2013.01); *C12N 15/90* (2013.01); *A61K 2239/31* (2023.05); *A61K 2239/38* (2023.05); *A61K 2239/48* (2023.05); *C12N 2740/15023* (2013.01); *C12N 2740/15042* (2013.01); *C12N 2800/90* (2013.01)

(58) Field of Classification Search
CPC ................................ A61K 40/17; C12N 15/63
See application file for complete search history.

(56) References Cited

U.S. PATENT DOCUMENTS

2009/0123366 A1* 5/2009 Dobson et al. ........ A61K 51/12
424/1.17
2016/0202242 A1 7/2016 Tanaka et al.

FOREIGN PATENT DOCUMENTS

KR 10-2006-0040931 11/2006
WO WO2017019848 A1 * 2/2017 ............. A61K 35/14

OTHER PUBLICATIONS

Liu et al. (1996) "Transcriptional activation of the Cdk inhibitor p21 by vitamin D3 leads to the induced differentiation of the myelomonocytic cell line U937" Genes & development, 10(2), 142-153. (Year: 1996).*
Herold et al. (2006) "Isolation and transduction of monocytes: promising vehicles for therapeutic arteriogenesis" Langenbeck's Archives of Surgery, 391, 72-82. (Year: 2006).*
Hannes et al. (2014) "Increased expression of p21 in CD14+ human monocytes correlates with telomere shortening in ocular sarcoidosis patients" Investigative Ophthalmology & Visual Science, 55(13), 1857-1857. (Year: 2014).*
Klichinsky et al. (Mar. 23, 2020) "Human chimeric antigen receptor macrophages for cancer immunotherapy" Nat Biotechnol 38, 947-953. (Year: 2020).*
Allouch et al. (2022) "CDKN1A is a target for phagocytosis-mediated cellular immunotherapy in acute leukemia" Nature Communications, 13:6739, 16 pages. (Year: 2022).*
Guo et al., "cyclin-dependent kinase inhibitor 1 isoform 1 [*Homo sapiens*]," GenBank Database; Accession No. NP_000380.1, 2024.
Kang et al., "G1 Phase Arrest of the Cell Cycle by a Ginseng Metabolite, Compound K, in U937 Human Monocytic Leukamia Cells," Arch. Pharm. Res., vol. 28, No. 6, pp. 685-690, 2005.
Kuffour et al., "USP18 (UBP43) Abrogates p21-Mediated Inhibition of HIV-1," Journal of Virology, vol. 92, Issue 20, p. e00592-18, Oct. 2018.
Wu et al., "Role of interferon-stimulated gene 15 in human immunodeficiency virus infection," Journal of Microbes and Infections, vol. 14, No. 1, pp. 52-58, Feb. 2019.
Yang et al., "Biological and Pharmacological Activities of Triterpenoids from Panax ginseng," Mod. Chin. Med., vol. 18, No. 1, pp. 36-55, Jan. 2016.

(Continued)

Primary Examiner — James Joseph Graber
(74) Attorney, Agent, or Firm — RINLAURES LLC; Li Hsien Rin-Laures; Kristen A. Dola

(57) ABSTRACT

Identification of effective targets alleviating the programmed cell removal (PrCR) of tumor cells by macrophages is of very high interest. The present inventors have identified that the cyclin-dependent kinase inhibitor p21 protein is a strong regulator of the macrophage-mediated PrCR. Also, they showed that the adoptive transfer of p21 overexpressing monocytes induces macrophage PrCR and transition from an anti-inflammatory to a pro-inflammatory phenotype in vivo, delays cancer progression and increases significantly the overall survival of mice engrafted with cancer cells. The present invention therefore concerns therapeutic compositions comprising monocytes that over-express the cyclin-dependent kinase inhibitor p21 protein, and their use for treating mammals suffering from cancer, especially leukemia.

16 Claims, 8 Drawing Sheets

Specification includes a Sequence Listing.

(56) References Cited

OTHER PUBLICATIONS

Zhang et al., "Compound K, a Ginsenoside Metabolite, Inhibits Colon Cancer Growth via Multiple Pathways Including p53-p21 Interactions," International Journal of Molecular Sciences, vol. 14, pp. 2980-2995, Jan. 2013.
Advani et al., "CD47 Blockade by Hu5F9-G4 and Rituximab in Non-Hodgkin's Lymphoma", New England Journal Medicine, Issue 379(18), p. 1711-1721, Nov. 1, 2018.f.
Andreesen et al., "Adoptive Transfer of Tumor Cytotoxic Macrophages Generated in Vitro from Circulating Blood Monocytes: A New Approach to Cancer Immunotherapy", Cancer Research, vol. 50, p. 7450-7456, Dec. 1, 1990.
Arandjelovic et al., "Phagocytosis of apoptotic cells in homeostasis", National Immunology, vol. 16(9), p. 907-917, Sep. 2015.
Aronovich et al., "The Sleeping Beauty transposon system: a non=viral vector for gene therapy", Human Molecular Genetics, vol. 20, Issue 1, Apr. 1, 2011.
Bartholeyns et al., "Adoptive Immunotherapy of Solid Tumors with Activated Macrophages: Experimental and Clinical Results", Anti-cancer Research, p. 1201-1204, 1991.
Berger et al., "SIV MAC Vpx improves the transduction of dendritic cells with nonintegrative HIV-1-derived vectors", Gene Therapy, vol. 16, p. 159-163, 2009.
Chao et al., "The CD47-SIRPa Pathway in Cancer Immune Evasion and Potential Therapeutic Implications", Current Opin Immunology, vol. 24(2), p. 225-232, Apr. 2012.
Extended European Search Report for EP Application No. EP19305963 dated May 2, 2020.
Feng et al., "Programmed cell removal by calreticulin in tissue homeostasis and cancer", Nature Communications, 2018.
Haddada et al., Efficient Adenovirus-Mediated Gene Transfer Into Human Blood Monocyte-Derived Macrophages, Biochemical and Biophysical Research Communications, vol. 195, No. 3, p. 1174-1183, Sep. 30, 1993.
International Search Report and Written Opinion for Application No. PCT/EP2020/070379, dated Jan. 25, 2022.
Jaiswal et al., "CD47 is up-regulated on circulating hematopoietic stem cells and leukemia cells to avoid phagocytosis", p. 271-285, Jul. 23, 2009.
Jaiswal, et al., "Macrophages as mediators of tumor immunosurveillance", Trends Immunology, Issue 31(6), p. 212-219, Jun. 2010.
Lee et al., "Macrophage-based cell therapies: The long and winding road", Journal of Controlled Release, Apr. 1, 2016.
Leyva et al., "Evaluation of transduction efficiency in marcophage colony-stimulating factor differentiated human macrophages using HIV-1 based lentiviral vectors", BMC Biotechnology, 2011.
Majeti et al., "CD47 is an adverse prognostic factor and therapeutic antibody target on human acute myeloid leukemia stem cells", vol. 138(2), p. 286-299, Jul. 23, 2009.
Neschadim et al., "A Roadmap to Safe, Efficient, and Stable Lentivirus-Mediated Gene Therapy with Hematopoietic Cell Transplantation", Biology of Blood and Marrow Transplantation, p. 1407-1416, 2007.
Pardoll, "The blockade of immune checkpoints in cancer immunotherapy", National Rev Cancer, vol. 12(4), p. 252-264, May 4, 2016.
Sharma et al., "Immune Checkpoint Targeting in Cancer Therapy: Towards Combination Strategies with Curative Potential", HHS Public Access, vol. 161(2), p. 205-214, Apr. 9, 2015.
Singh et al., "Macrophage Gene Therapy; opening novel therapeutic avenues for immune disorders (version 1; referees:1 approved with reservations, 1 not approved)", F1000 Research, 2015.
Weiskopf, "Cancer immunotherapy targeting the CD47/SIRP x asix", European Journal of Cancer, vol. 76, p. 100-109, 2017.
Nicolae et al., "NFκB regulates p21 expression and controls DNA damage-induced leukemic differentiation," Oncogene, vol. 37, pp. 3647-3656, Apr. 2018.
Hannes et al., Increased expression of p21 in CD14+human monocytes correlates with telomere shortening in ocular sarcoidosis patients, *Invest. Ophthalmol. Vis. Sci.*, 55(13): 1857 (Apr. 2014)—Abstract.
Roy et al., p27 and Leukemia: Cell Cycle and Beyond, J. Cell. Physiol. 230(3): 504-9 (2015).

\* cited by examiner

SEQUENCE LISTING

<160> NUMBER OF SEQ ID NOS: 7

<210> SEQ ID NO 1
<211> LENGTH: 2122
<212> TYPE: DNA
<213> ORGANISM: homo sapiens
<220> FEATURE:
<221> NAME/KEY: misc_feature
<223> OTHER INFORMATION: Human p21 mRNA transcript variant 2

<400> SEQUENCE: 1

| | | | | | |
|---|---|---|---|---|---|
| ggtggctatt | ttgtccttgg | gctgcctgtt | ttcagctgct | gcaaccacag | ggatttcttc | 60 |
| tgttcaggcg | ccatgtcaga | accggctggg | gatgtccgtc | agaacccatg | cggcagcaag | 120 |
| gcctgccgcc | gcctcttcgg | cccagtggac | agcgagcagc | tgagccgcga | ctgtgatgcg | 180 |
| ctaatggcgg | gctgcatcca | ggaggcccgt | gagcgatgga | acttcgactt | tgtcaccgag | 240 |
| acaccactgg | agggtgactt | cgcctgggag | cgtgtgcggg | ccttggcct | gcccaagctc | 300 |
| taccttccca | cggggccccg | cgaggccgg | gatgagttgg | gaggaggcag | gcggcctggc | 360 |
| acctcacctg | ctctgctgca | ggggacagca | gaggaagacc | atgtggacct | gtcactgtct | 420 |
| tgtacccttg | tgcctcgctc | aggggagcag | gctgaagggt | ccccaggtgg | acctggagac | 480 |
| tctcagggtc | gaaaacggcg | gcagaccagc | atgacagatt | tctaccactc | caaacgccgg | 540 |
| ctgatcttct | ccaagaggaa | gcctaatcc | gcccacagga | agcctgcagt | cctggaagcg | 600 |
| cgagggcctc | aaaggcccgc | tctacatctt | ctgccttagt | ctcagtttgt | gtgtcttaat | 660 |
| tattatttgt | gttttaattt | aaacacctcc | tcatgtacat | accctggccg | cccctgccc | 720 |
| cccagcctct | ggcattagaa | ttatttaaac | aaaaactagg | cggttgaatg | agaggttcct | 780 |
| aagagtgctg | ggcatttta | ttttatgaaa | tactatttaa | agcctcctca | tcccgtgttc | 840 |
| tccttttcct | ctctcccgga | ggttgggtgg | gccggcttca | tgccagctac | ttcctcctcc | 900 |
| ccacttgtcc | gctgggtggt | accctctgga | ggggtgtggc | tccttcccat | cgctgtcaca | 960 |
| ggcggttatg | aaattcaccc | cctttcctgg | acactcagac | ctgaattctt | tttcatttga | 1020 |
| gaagtaaaca | gatggcactt | tgaaggggcc | tcaccgagtg | ggggcatcat | caaaaacttt | 1080 |
| ggagtcccct | cacctcctct | aaggttgggc | agggtgaccc | tgaagtgagc | acagcctagg | 1140 |
| gctgagctgg | ggacctggta | ccctcctggc | tcttgatacc | cccctctgtc | ttgtgaaggc | 1200 |
| agggggaagg | tgggtcctg | gagcagacca | ccccgcctgc | cctcatggcc | cctctgacct | 1260 |
| gcactgggga | gccgtctca | gtgttgagcc | ttttccctct | ttggctcccc | tgtacctttt | 1320 |
| gaggagcccc | agctaccctt | cttctccagc | tgggctctgc | aattcccctc | tgctgctgtc | 1380 |
| cctccccctt | gtcctttccc | ttcagtaccc | tctcagctcc | aggtggctct | gaggtgcctg | 1440 |
| tcccacccc | accccagct | caatggactg | aaggggaag | ggacacacaa | gaagaagggc | 1500 |
| accctagttc | tacctcaggc | agctcaagca | gcgaccgccc | cctcctctag | ctgtgggggt | 1560 |
| gagggtccca | tgtggtggca | caggccccct | tgagtggggt | tatctctgtg | ttagggtat | 1620 |
| atgatgggg | agtagatctt | tctaggaggg | agacactggc | ccctcaaatc | gtccagcgac | 1680 |
| cttcctcatc | caccccatcc | ctccccagtt | cattgcactt | tgattagcag | cggaacaagg | 1740 |
| agtcagacat | tttaagatgg | tggcagtaga | ggctatggac | agggcatgcc | acgtgggctc | 1800 |
| atatgggct | gggagtagtt | gtctttcctg | gcactaacgt | tgagcccctg | gaggcactga | 1860 |
| agtgcttagt | gtactggag | tattgggtc | tgacccaaa | caccttccag | ctcctgtaac | 1920 |
| atactggcct | ggactgtttt | ctctcggctc | cccatgtgtc | ctggttcccg | tttctccacc | 1980 |

```
tagactgtaa acctctcgag ggcagggacc acaccctgta ctgttctgtg tctttcacag    2040
ctcctcccac aatgctgaat atacagcagg tgctcaataa atgattctta gtgactttac    2100
ttgtaaaaaa aaaaaaaaaa aa                                              2122
```

<210> SEQ ID NO 2
<211> LENGTH: 164
<212> TYPE: PRT
<213> ORGANISM: homo sapiens
<220> FEATURE:
<221> NAME/KEY: MISC_FEATURE
<223> OTHER INFORMATION: human p21 protein isoform 1

<400> SEQUENCE: 2

```
Met Ser Glu Pro Ala Gly Asp Val Arg Gln Asn Pro Cys Gly Ser Lys
1               5                   10                  15

Ala Cys Arg Arg Leu Phe Gly Pro Val Asp Ser Glu Gln Leu Ser Arg
            20                  25                  30

Asp Cys Asp Ala Leu Met Ala Gly Cys Ile Gln Glu Ala Arg Glu Arg
        35                  40                  45

Trp Asn Phe Asp Phe Val Thr Glu Thr Pro Leu Glu Gly Asp Phe Ala
    50                  55                  60

Trp Glu Arg Val Arg Gly Leu Gly Leu Pro Lys Leu Tyr Leu Pro Thr
65                  70                  75                  80

Gly Pro Arg Arg Gly Arg Asp Glu Leu Gly Gly Gly Arg Arg Pro Gly
                85                  90                  95

Thr Ser Pro Ala Leu Leu Gln Gly Thr Ala Glu Glu Asp His Val Asp
            100                 105                 110

Leu Ser Leu Ser Cys Thr Leu Val Pro Arg Ser Gly Glu Gln Ala Glu
        115                 120                 125

Gly Ser Pro Gly Gly Pro Gly Asp Ser Gln Gly Arg Lys Arg Arg Gln
    130                 135                 140

Thr Ser Met Thr Asp Phe Tyr His Ser Lys Arg Arg Leu Ile Phe Ser
145                 150                 155                 160

Lys Arg Lys Pro
```

<210> SEQ ID NO 3
<211> LENGTH: 1913
<212> TYPE: DNA
<213> ORGANISM: mus musculus
<220> FEATURE:
<221> NAME/KEY: misc_feature
<223> OTHER INFORMATION: p21 mouse, mRNA transcript variant 1

<400> SEQUENCE: 3

```
tgcagcagcc gagaggtgtg agccgccgcg gtgtcagagt ctaggggaat tggagtcagg     60
cgcagatcca cagcgatatc cagacattca gagccacagg caccatgtcc aatcctggtg    120
atgtccgacc tgttccgcac aggagcaaag tgtgccgttg tctcttcggt cccgtggaca    180
gtgagcagtt gcgccgtgat tgcgatgcgc tcatggcggg ctgtctccag gagggcccgag   240 aacggtggaa ctttgacttc gtcacggaga cgccgctgga gggcaacttc gtctgggagc    300
gcgttcggag cctagggctg cccaaggtct acctgagccc tggtcccgc agccgtgacg     360 acctgggagg ggacaagagg cccagtactt cctctgccct gctgcagggg ccagctccgg    420
aggaccacgt ggccttgtcg ctgtcttgca ctctggtgtc tgagcggcct gaagattccc    480
cgggtgggcc cggaacatct cagggccgaa acggaggca gaccagcctg acagatttct     540
atcactccaa gcgcagattg gtcttctgca agagaaaacc ctgaagtgcc cacggagcc     600
```

```
ccgccctctt ctgctgtggg tcaggaggcc tcttccccat cttcggcctt agccctcact    660
ctgtgtgtct taattattat ttgtgttttta atttaaacgt ctcctgtata tacgctgcct    720
gccctctccc agtctccaaa cttaaagtta tttaaaaaaa gaacaaaaca aaacaaaaaa    780
aaccaaaaca aaacaaacct aaattagtag gacggtaggg cccttagtgt gggggatttc    840
tattatgtag attattatta tttaagcccc tcccaaccca agctctgtgt ttcctatacc    900
ggaggaacag tcctactgat atcaacccat ctgcatccgt ttcacccaac cccctcccc     960 ccattccctg cctggttcct tgccacttct tacctggggg tgatcctcag acctgaatag   1020
cactttggaa aaatgagtag gactttgggg tctccttgtc acctctaagg ccagctagga   1080
tgacagtgaa gcagtcacag cctagaacag ggatggcagt taggactcaa ccgtaatatc   1140
ccgactcttg acattgctca gacctgtgaa gacaggaatg gtccccactc tggatcccct   1200
ttgccactcc tggggagccc acctctcctg tgggtctctg ccagctgccc ctctattttg   1260
gagggttaat ctggtgatct gctgctcttt tcccccaccc catacttccc cttctgcagg   1320
tcggcaggag gcatatctag gcacttgccc cacagctcag tggactggaa gggaatgtat   1380
atgcagggta cactaagtgg gattccctgg tcttaccta ggcagctcca gtggcaaccc   1440
cctgcattgt gggtctaggg tgggtccttg gtggtgagac aggcctccca gagcattcta   1500
tggtgtgtgg tggtgggggt gggcttatct gggatgggga ccccagttgg ggttctcagt   1560
gacttctccc atttcttagt agcagttgta caaggagcca ggccaagatg gtgtcttggg   1620
ggctaaggga gctcacagga cactgagcaa tggctgatcc ttctcagtg ttgaataccg    1680 tgggtgtcaa agcacttagt gggtctgact ccagccccaa acatccctgt ttctgtaaca   1740
tcctggtctg gactgtctac ccttagcccg caccccaaga acatgtattg tggctccctc   1800
cctgtctcca ctcagattgt aagcgtctca cgagaaggga cagcaccctg cattgtcccg   1860
agtcctcaca cccgacccca aagctggtgc tcaataaata cttctcgatg att          1913
```

<210> SEQ ID NO 4
<211> LENGTH: 159
<212> TYPE: PRT
<213> ORGANISM: mus musculus
<220> FEATURE:
<221> NAME/KEY: MISC_FEATURE
<223> OTHER INFORMATION: p21 mouse protein

<400> SEQUENCE: 4

```
Met Ser Asn Pro Gly Asp Val Arg Pro Val Pro His Arg Ser Lys Val
1               5                   10                  15

Cys Arg Cys Leu Phe Gly Pro Val Asp Ser Glu Gln Leu Arg Arg Asp
            20                  25                  30

Cys Asp Ala Leu Met Ala Gly Cys Leu Gln Glu Ala Arg Glu Arg Trp
        35                  40                  45

Asn Phe Asp Phe Val Thr Glu Thr Pro Leu Glu Gly Asn Phe Val Trp
    50                  55                  60

Glu Arg Val Arg Ser Leu Gly Leu Pro Lys Val Tyr Leu Ser Pro Gly
65                  70                  75                  80

Ser Arg Ser Arg Asp Asp Leu Gly Gly Asp Lys Arg Pro Ser Thr Ser
                85                  90                  95

Ser Ala Leu Leu Gln Gly Pro Ala Pro Glu Asp His Val Ala Leu Ser
            100                 105                 110

Leu Ser Cys Thr Leu Val Ser Glu Arg Pro Glu Asp Ser Pro Gly Gly
        115                 120                 125
```

Pro Gly Thr Ser Gln Gly Arg Lys Arg Arg Gln Thr Ser Leu Thr Asp
    130                 135                 140

Phe Tyr His Ser Lys Arg Arg Leu Val Phe Cys Lys Arg Lys Pro
145                 150                 155

```
<210> SEQ ID NO 5
<211> LENGTH: 495
<212> TYPE: DNA
<213> ORGANISM: mus musculus
<220> FEATURE:
<221> NAME/KEY: misc_feature
<223> OTHER INFORMATION: nucleic sequence of p21 in SIN lentiviral
      vector of the examples

<400> SEQUENCE: 5
atgtcagaac cggctgggga tgtccgtcag aacccatgcg gcagcaaggc ctgccgccgc      60
ctcttcggcc cagtggacag cgagcagctg agccgcgact gtgatgcgct aatggcgggc    120
tgcatccagg aggcccgtga gcgatggaac ttcgactttg tcaccgagac accactggag    180
ggtgacttcg cctgggagcg tgtgcggggc cttggcctgc ccaagctcta ccttcccacg    240 gggcccggc gaggccggga tgagttggga ggaggcaggc ggcctggcac ctcacctgct     300
ctgctgcagg ggacagcaga ggaagaccat gtggacctgt cactgtcttg taccccttgtg   360 cctcgctcag gggagcaggc tgaagggtcc ccaggtggac ctggagactc tcagggtcga    420
aaacggcggc agaccagcat gacagatttc taccactcca acgccggct gatcttctcc     480 aagaggaagc cctaa                                                     495

<210> SEQ ID NO 6
<211> LENGTH: 19
<212> TYPE: RNA
<213> ORGANISM: artificial
<220> FEATURE:
<223> OTHER INFORMATION: siRNA against p21

<400> SEQUENCE: 6
agaccagcau gacagauuu                                                  19

<210> SEQ ID NO 7
<211> LENGTH: 1515
<212> TYPE: DNA
<213> ORGANISM: HOMO SAPIENS
<220> FEATURE:
<221> NAME/KEY: misc_feature
<223> OTHER INFORMATION: hsSIRPa cDNA

<400> SEQUENCE: 7
atggagcccg ccggcccggc ccccggccgc tcgggccgc tgctctgcct gctgctcgcc       60
gcgtcctgcg cctggtcagg agtggcgggt gaggaggagc tgcaggtgat tcagcctgac    120
aagtccgtgt tggttgcagc tggagagaca gccactctgc gctgcactgc gacctctctg    180
atccctgtgg ggcccatcca gtggttcaga ggagctggac caggccggga attaatctac    240
aatcaaaaag aaggccactt cccccgggta caactgtttt cagacctcac aaagagaaac    300
aacatggact tttccatccg catcggtaac atcaccccag cagatgccgg cacctactac    360
tgtgtgaagt tccggaaagg agccccgat gacgtggagt ttaagtctgg agcaggcact    420
gagctgtctg tgcgcgccaa accctctgcc ccgtggtat cgggccctgc ggcgagggcc      480
acacctcagc acacagtgag cttcacctgc gagtcccacg gcttctcacc cagagacatc    540
accctgaaat ggttcaaaaa tgggaatgag ctctcagact tccagaccaa cgtggacccc    600
```

```
gtaggagaga gcgtgtccta cagcatccac agcacagcca aggtggtgct gacccgcgag      660
gacgttcact ctcaagtcat ctgcgaggtg gcccacgtca ccttgcaggg ggaccctctt      720
cgtgggactg ccaacttgtc tgagaccatc cgagttccac ccaccttgga ggttactcaa      780
cagcccgtga gggcagagaa ccaggtgaat gtcacctgcc aggtgaggaa gttctacccc      840
cagagactac agctgacctg gttggagaat ggaaacgtgt cccggacaga aacggcctca      900
accgttacag agaacaagga tggtacctac aactggatga gctggctcct ggtgaatgta      960
tctgcccaca gggatgatgt gaagctcacc tgccaggtgg agcatgacgg gcagccagcg     1020
gtcagcaaaa gccatgacct gaaggtctca gcccacccga aggagcaggg ctcaaatacc     1080
gccgctgaga acactggatc taatgaacgg aacatctata ttgtggtggg tgtggtgtgc     1140
accttgctgg tggccctact gatggcggcc ctctacctcg tccgaatcag acagaagaaa     1200
gcccagggct ccacttcttc tacaaggttg catgagcccg agaagaatgc cagagaaata     1260
acacaggaca caaatgatat cacatatgca gacctgaacc tgcccaaggg gaagaagcct     1320
gctccccagg ctgcggagcc caacaaccac acggagtatg ccagcattca gaccagcccg     1380
cagcccgcgt cggaggacac cctcacctat gctgacctgg acatggtcca cctcaaccgg     1440 accccaagc agccggcccc caagcctgag ccgtccttct cagagtacgc cagcgtccag     1500
gtcccgagga agtga                                                     1515
```

P21 EXPRESSING MONOCYTES FOR CANCER CELL THERAPY

SUMMARY

Identification of effective targets alleviating the programmed cell removal (PrCR) of tumor cells by macrophages is of very high interest. The present inventors have identified that the cyclin-dependent kinase inhibitor p21 protein is a strong regulator of the macrophage-mediated PrCR. Also, they showed that the adoptive transfer of p21 overexpressing monocytes induces macrophage PrCR and transition from an anti-inflammatory to a pro-inflammatory phenotype in vivo, delays cancer progression and increases significantly the overall survival of mice engrafted with cancer cells. The present invention therefore concerns therapeutic compositions comprising monocytes that over-express the cyclin-dependent kinase inhibitor p21 protein, and their use for treating mammals suffering from cancer, especially leukemia.

TECHNICAL BACKGROUND

When properly activated, effector cells of both the innate and adaptive immune systems possess the ability to successfully attack cancer cells. In the past, it has been proposed to inhibit negative adaptive immune regulators (such as the cytotoxic T-lymphocyte-associated antigen 4 (CTLA-4) and the programmed cell death protein 1 (PD-1)) or enhance the normal capacity of the patient's immune response using adoptive transfer of engineered patient's own immune cells (such as chimeric antigen receptor (CAR) T cells). Such treatment has led to significant advances in the treatment of solid cancers and hematological disorders (Pardoll D M., *Nat Rev Cancer* (2012) and Sharma S H et al, *Cell* (2015)).

However, there is a need of a more complete understanding of immunoregulation in order to develop novel therapeutic cancer strategies.

Programmed cell removal (PrCR) is a process of macrophage-mediated immune surveillance by which target cells are recognized and phagocytosed (Jaiswal et al., *Trends Immunol* (2010)). Initially described as a key mechanism that links programmed cell death to the removal of dying cells (Arandjelovic and Ravichandran, *Nat Immunol* (2015)), PrCR has been also involved in the clearance of living tumor cells (Majeti et al., *Cell* (2009)).

The efficacy of PrCR is determined by the balance between the recognition of pro-phagocytic ("eat me") signals by macrophages and the inhibition of macrophages via the activation of anti-phagocytic ("don't eat me") pathways by target cancer cells (Chao et al., *Nat Rev Cancer* (2011)). The secretion of the "eat me" signal calreticulin (CRT) from macrophages was recently identified as a first signal that favors PrCR through the binding of asialoglycans on target cancer cells (Feng et al., *Nat Comm* (2018)). Inversely, the transmembrane protein CD47 has been identified as a "don't eat me" signal that inhibits PrCR by binding and activating signal regulatory protein alpha (SIRPα), an inhibitory receptor of phagocytosis expressed on the macrophage membranes (Jaiswal et al., *Cell* (2009)). A study has demonstrated that blocking the CD47-SIRPα axis with CD47-blocking monoclonal antibodies selectively induces the engulfment of tumor cells and demonstrated efficacy in various preclinical models of lymphoma, bladder cancer, colon cancer, glioblastoma, breast cancer, acute lymphocyte leukemia and acute myeloid leukemia (Weiskopf K. *Eur J Cancer* (2017)). More recently, the combination of CD47 blockade with Rituximab showed promising activity in patients with relapsed or refractory non Hodgkin's lymphoma (Advani R. et al., *N Engl J Med* (2018)), highlighting the fact that targeting macrophage immune checkpoint (MIC) for unleashing PrCR represents a substantial therapeutic opportunity.

Identification of effective targets alleviating the programmed cell removal (PrCR) of tumor cells by macrophages is therefore of very high interest. The present invention addresses this need.

DETAILED DESCRIPTION OF THE INVENTION

As disclosed in the examples below, the present inventors have discovered that depleting the cyclin-dependent kinase inhibitor p21 in primary human macrophages blocks their phagocytic capacity, and therefore diminishes their immune surveillance (FIGS. 1*j* and 1*k*). They identified for the first time that the p21 protein is a strong regulator of the macrophage-mediated PrCR. They showed that overexpression of p21 can act as a macrophage immune checkpoint (MIC) inhibitor, thanks to which tumor cells are eventually recognized, phagocytosed and destroyed.

Accordingly, they showed that the adoptive transfer of p21 overexpressing monocytes induces macrophage PrCR and transition from an anti-inflammatory to a pro-inflammatory phenotype in vivo, delays cancer progression and increases significantly the overall survival of mice engrafted with cancer cells (FIG. 1*r*).

The present invention concerns cell compositions and their incorporation into pharmaceutical compositions that can be used in cancer therapy, more particularly, in cancer immunotherapy. Specifically, it relates to the isolation, culture, activation and genetic modification of cells of the mononuclear phagocytic system, and their use in cell therapy, for example in adoptive immunotherapy.

The cells of the mononuclear phagocytic system comprise peripheral blood monocytes, their bone marrow or blood precursors and tissue macrophages. Monocytes are formed in the bone marrow, which they leave after maturation, passing from the peripheral blood to the tissues. Human monocytes circulating in the blood have a half-life of approximately 3 days. When it reaches the tissues, the monocyte is called a macrophage. The total number of tissue macrophages greatly exceeds the number of circulating monocytes, by a factor of approximately 400. Macrophages are found everywhere in the body, but are especially numerous in the liver (Kupffer cells), in the lymph nodes, in the lungs, in the peritoneum and in the skin (Langerhans' cells). The passage of monocytes from the general circulation to the tissues is irreversible.

Monocytes and macrophages are known to have numerous and important functions, including induction of immune responses in acute phases, regulation of haematopoiesis, activation of the immune system, coagulation, destruction of organisms and of tumour cells and tissue repair and cicatrisation.

Monocytes-macrophages can also be used in adoptive immunotherapy for the treatment of some types of cancer in man. Typically, these cells can be purified from the circulating blood of patients, cultured ex vivo and activated with interferon γ to induce their differentiation and increase their tumoricidal power, then reinjected into the patients. It is also possible, using suitable vectors, to transfer genes ex vivo into monocyte-derived macrophage cells, thereby enabling them to be endowed with superior properties in terms of cytotoxicity and of stimulation of the immune system.

In a first aspect, the present invention therefore relates to a pharmaceutical composition comprising monocytes that overexpress the cyclin-dependent kinase inhibitor p21 protein. These monocytes once engrafted in the tissues will differentiate into macrophages.

This pharmaceutical composition is hereafter referred to as the "composition of the invention", the "pharmaceutical composition of the invention", or the "cell composition of the invention".

In particular, the present invention concerns the use of monocytes that overexpress the cyclin-dependent kinase inhibitor p21 protein, for preparing a medicament intended to strengthen a patient's immune and haematopoietic system in order to treat cancer, specifically leukemia.

As used herein, the term "p21 protein" designates interchangeably the cyclin-dependent kinase inhibitor 1 which is also known as "p21$^{Cip1}$", "p21$^{Waf1}$", "Waf1", "CDKN1A", "CAP20", "CIP1", "MDA-6", "SDI1" and "CDK-interacting protein 1". This protein binds to and inhibits the activity of the cyclin-CDK1, CDK2 and CDK4/6 complexes and thus functions as a regulator of cell cycle progression at G1 and S phase. The binding of p21 to CDK complexes occurs through p21's N-terminal domain, which is homologous to the other CIP/CDK inhibitors p27 and p57. As a major target of p53 activity, it is usually associated with linking DNA damage to cell cycle arrest. This protein is encoded by the CDKN1A gene of SEQ ID NO:1 (NM_078467) located on the chromosome 6 (6p21.2) in humans. In mice, the protein is encoded by the CDKN1A gene of SEQ ID NO:3 (NM_007669). The human p21 protein has the amino acid sequence of SEQ ID NO:2 (NP_000380), whereas the mouse p21 protein has the amino acid sequence of SEQ ID NO:4 (NP_031695).

The term "p21 protein" herein also encompass functional variants and/or fragments of the above-mentioned p21 proteins.

"Functional variants" are for example the wild-type p21 proteins of animal species other than human or mouse (e.g., from horse, dog, cats, or cattle animals). These proteins are now well-characterized and their sequence can be easily retrieved from conventional data bases. "Functional variants" are also mutated version of the natural p21 proteins, whose amino acid sequence share a percentage of identity of at least 75%, preferably of at least 80%, more preferably of at least 90% with the wild-type protein of the corresponding species (for a human therapy, with SEQ ID NO:2, for a mouse therapy, with SEQ ID NO:4, etc).

In the context of the invention, the identity percentage between said two homologous sequences is identified by a global alignment of the sequences in their entirety, this alignment being performed by means of an algorithm that is well known by the skilled person, such as the one disclosed in Needleman and Wunsch (1970). Accordingly, sequence comparisons between two amino acid sequences or two nucleotide sequences can be performed for example by using any software known by the skilled person, such as the "needle" software using the "Gap open" parameter of 10, the "Gap extend" parameter of 0.5 and the "Blosum 62" matrix.

"Functional fragments" of the p21 protein are any fragment of the wild-type p21 protein or of functional variants thereof, that retains the function of p21 protein to enhance the programmed cell removal (PrCR) of tumor cells by macrophages.

In a preferred embodiment, the monocytes comprised in the pharmaceutical composition of the invention contain a replication defective recombinant virus encoding the cyclin-dependent kinase inhibitor p21 or a non-viral recombinant nucleic acid containing the gene encoding p21 placed under the control of regulatory elements permitting its expression. This recombinant virus or nucleic acid makes it possible to overexpress the cyclin-dependent kinase inhibitor p21 protein. Said recombinant nucleic acid is preferably a DNA plasmid. We can also use the non-viral Sleeping Beauty stable transposition of p21 gene from supercoiled minimal DNA vectors called minicircles. The genetic engineering of the monocytes could also be performed by the use of the non-viral transfer of in vitro translated p21 mRNA in the monocytes.

By "overexpressing the cyclin-dependent kinase inhibitor p21 protein", it is herein meant that the overall expression level of the p21 protein is higher in the macrophages contained in the composition of the invention than in conventional non-treated macrophages. This overexpression can be detected by any conventional means enabling the measurement of protein levels, such as western blot. To be used in the composition of the invention, the macrophages are genetically modified so that the final expression of p21 is at least two or three times higher than in untreated control macrophages. The stable integration of p21 gene in the monocyte genome ensures the durability of the expression the cyclin-dependent kinase inhibitor p21 protein in the differentiated macrophages engrafted in the tissues. Besides considering the long longevity of macrophages in the tissues, the durability of p21 protein expression is further ensured.

The use of a vector (plasmid or virus or in vitro translated mRNA) makes it possible to improve the administration of the nucleic acid encoding p21 in the target cells, and also to increase the stability of said nucleic acid into said cells, thereby enabling a long-lasting effect to be obtained.

In a preferred embodiment, said vector is chosen in the group consisting of: adenovirus, adeno-associated virus (AAV), herpesvirus, lentivirus, vaccinia virus, cytomegalovirus (CMV) and the like, that have been shown to effectively transfect macrophages (Singh G. et al, *F1000 research* 2015).

Advantageously, said virus is a defective virus. The term "defective virus" denotes a virus incapable of replicating in the target cell. Generally, the genome of the defective viruses used in the context of the present invention hence lacks at least the sequences needed for the replication of the said virus in the infected cell. These regions may be either removed (wholly or partially), or rendered non-functional, or replaced by other sequences, in particular by the recombinant nucleic acid. Preferably, the defective virus nevertheless retains the sequences of its genome which are needed for encapsulation of the viral particle.

In particular, the AAV vector display several advantages such as i) a long lasting expression of synthesized genes, ii) a low risk for pathogenic reactions (because they are artificially manufactured and not toxic), iii) they trigger low immunogenic response and iv) they do not integrate the human genome. In order to increase the efficacy of gene expression, and prevent the unintended spread of the virus, genetic modifications of AAV can be performed. These genetic modifications include the deletion of the E1 region, deletion of the E1 region along with deletion of either the E2 or E4 region, or deletion of the entire adenovirus genome except the cis-acting inverted terminal repeats and a packaging signal. Such vectors are advantageously encompassed by the present invention. We can also use the non-viral Sleeping Beauty stable transposition of p21 gene from supercoiled minimal DNA vectors called minicircles. The genetic engineering of the monocytes could also be performed by the use of the non-viral transfer of in vitro translated p21 mRNA in the monocytes. The plasmids in these two methods are delivered by transfection of monocytes through electroporation.

Another advantageous vector for the preparation of the cell compositions according to the invention is an adenoviral vector. Indeed, Haddada H. et al. *Biochem. Biophys. Res. Commun* (1993) showed that adenoviruses are capable of very effectively infecting cells of the monocyte-macrophage line, of being maintained stably therein and of expressing a therapeutic gene. Different serotypes of adenovirus exist, the structure and properties of which vary somewhat but which are not pathogenic for man, and in particular for non-immunosuppressed subjects. Moreover, these viruses do not integrate in the genome of the cells they infect, and can incorporate large fragments of exogenous DNA. Among the different serotypes, it is preferable in the context of the present invention to use adenoviruses type 2 or 5 (Ad 2 or Ad 5). In the case of Ad 5 adenoviruses, the sequences needed for replication are the E1A and E1B regions. These sequences are preferable deleted from the recombinant nucleic acid used in the present invention.

Another advantageous vector for the preparation of the cell compositions according to the invention is a lentivirus. Lentiviruses like HIV have the capacity to infect non-dividing and dividing cells and to integrate into the host cell genome. Due to these characteristics, HIV-based lentiviral vectors have been proposed as good delivery system candidates for gene therapy, but the attempt to use them in clinical trials has raised concerns about their safety including the risk of genetic recombination leading to the generation of replication-competent retrovirus in humans.

Further modifications in the packaging and genetic components of viral genes have been carried out to develop safer HIV-based lentiviral vector systems. Today, a number of safe HIV-based lentiviral vectors have been designed for efficiently transducing target genes into differentiated monocyte-derived macrophages (Leyva F. et al, *BMC biotechnology* (2011). Any of these vectors can be used in the context of the present invention.

Preferred lentiviral vectors are those that have been modified so as to be safely administered into mammals. These vectors are for example the HIV/SIV vectors known to be useful in human or mammal gene therapy, as disclosed in Neschadim A. et al. Biol Blood Marrow Transplant. 2007 December; 13(12):1407-16. The most interesting vectors to use are the HIV and SIV based lentiviral Self Inactivating vectors (Neschadim A. et al. Biol Blood Marrow Transplant. 2007 December; 13(12):1407-16.), the adenoviral vectors (Haddada H. et al. *Biochem. Biophys. Res. Commun* (1993)) and the sleeping Beauty transposon non-viral vectors (Aronovich et al. *Human. Molecular. Genetics* (2011)).

The vector used in the example i.e., the HIV-1 based Self inactivated (SIN) lentiviral vector encoding the p21 protein, can be used. This vector can encode the p21 protein alone or fused with another protein such as AIP (aryl hydrocarbon receptor interacting protein) or fused to small protein tags such Flag tag or hemagglutinin (HA) tag.

In a particularly preferred embodiment, the composition of the invention also contains Viral Like Particles (VLPs) containing SIVmac-VPX to induce the degradation of factors that impair the lentiviral infection (Berger G., *Gene Therapy* (2009)). The SIVmac-VPX degrades SAMHD1, which was identified as an HIV-1 restriction factor that hydrolyzes dNTPs required for retroviral replication (Lahouassa et al., *Nat Immunol* (2012)).

In an even more particularly preferred embodiment, the monocytes contained in the cell composition of the invention have been transduced by a SIN lentiviral vector containing the following nucleic acid sequence SEQ ID NO:5 encoding for p21 protein:

```
ATG TCA GAA CCG GCT GGG GAT GTC CGT CAG AAC CCA
TGCGGCAGCAAGGCCTGCCGCCGCCTCTTCGGCCCAGTGGACAGCGAGCAG
CTGAGCCGCGACTGTGATGCGCTAATGGCGGGCTGCATCCAGGAGGCCCGT
GAGCGATGGAACTTCGACTTTGTCACCGAGACACCACTGGAGGGTGACTTC
GCCTGGGAGCGTGTGCGGGGCCTTGGCCTGCCCAAGCTCTACCTTCCCACG
GGGCCCCGGCGAGGCCGGGATGAGTTGGGAGGAGGCAGGCGGCCTGGCACC
TCACCTGCTCTGCTGCAGGGGACAGCAGAGGAAGACCATGTGGACCTGTCA
CTGTCTTGTACCCTTGTGCCTCGCTCAGGGGAGCAGGCTGAAGGGTCCCCA
GGTGGACCTGGAGACTCTCAGGGTCGAAAACGGCGGCAGACCAGCATGACA
GATTTCTACCACTCCAAACGCCGGCTGATCTTCTCCAAGAGGAAGCCCTAA
```

As stated above, the p21 encoding gene is placed under the control of regulatory elements permitting its expression. These regulatory elements generally consist of transcription promoter sequences. These can be sequences which are naturally responsible for the expression of p21, when these sequences are capable of functioning in monocytes-macrophages. They can also be sequences of different origin (responsible for the expression of other proteins, or even synthetic genes). In particular, they can be promoter sequences of eukaryotic or viral genes. For example, they can be promoter sequences originating from the genome of the monocyte which it is desired to infect. Similarly, they can be promoter sequences originating from the genome of a virus. In this connection, the promoters E2F1 (E2 promoter binding factor 1) or the promoters of EFS (elongation factor 1α short), SFFV (silencing-prone spleen focus forming virus), CMV (cytomegalovirus), RSV (Rous sarcoma virus), and the like, genes may be mentioned for example. In addition, these expression sequences may be modified by the addition of activator sequences, regulatory sequences, and the like.

The choice of the vector and of the regulatory sequences should be done by the skilled person keeping in mind that the final expression of p21 by the macrophages of the invention should be enhanced by at least two or three times as compared with mock-transfected control macrophages.

Methods to construct expression vectors containing coding sequences and appropriate transcriptional/translational control signals are well known in the art. These methods include, for example, in vitro recombinant DNA techniques, synthetic techniques and in vivo recombination/genetic recombination. The nucleic acids may be isolated and obtained in substantial purity, then introduced into suitable host cells using a variety of techniques available in the art.

All the techniques of construction of vectors derived from adenoviruses, lentiviruses, or from AAV, and incorporation of heterologous nucleic acid sequences in same, have been described in the literature and can be used in the context of the present invention. The methods traditionally used in molecular biology, such as preparative extractions of plasmid DNA, centrifugation of plasmid DNA in a caesium chloride gradient, agarose or acrylamide gel electrophoresis, purification of DNA fragments by electroelution, phenol or phenol-chloroform extraction of proteins, ethanol or isopropanol precipitation of DNA in a saline medium, transformation in *Escherichia coli*, and the like, are well known to a person skilled in the art and are amply described in the literature [Maniatis T. et al., "Molecular Cloning, a Laboratory Manual", Cold Spring Harbor Laboratory, Cold Spring Harbor, N.Y., 1982; Ausubel F. M. et al. (eds), "Current Protocols in Molecular Biology", John Wiley & Sons, New York, 1987].

Once the genome of the viruses has been genetically modified, the viruses are multiplied and recovered and purified according to standard techniques of molecular biology.

The pharmaceutical composition of the invention contains monocytes that overexpress the p21 protein.

As used herein, the term "monocyte-derived macrophages" designates mononuclear cells that have been cultivated and differentiated into macrophages from peripheral blood monocytes (PBMCs), or from their bone marrow or blood precursors, under the conditions detailed in the examples (see also Andressen R. et al., Cancer Res. 1990; Bartholeyns J et al., Anticancer Res. (1991)). As precursors, it is also possible to use pluripotent stem cells, myeloid stem cells (CFU-GEMM), myelomonocytic stem cells (CFU-GM), CFU-M, monoblasts or promonocytes. The intravenous injections of monocytes induced their engraftment and their differentiation into macrophages in the bone marrow, in the spleen and in the liver.

Since PBMCs are found in the blood, a PBMCs sample can be obtained by a completely harmless and non-invasive blood collection from the subject.

Withdrawal and isolation of PBMCs/monocyte-macrophage cells or their precursors may be performed by any technique known to a person skilled in the art. These different techniques can involve physical separation steps (centrifugation, cell sorting (FACS), and the like), and selection with immunological compounds (specific antibodies for cell markers and the like) or biochemical compounds (membrane receptor ligands), and the like. Cultivating the isolated cells may be performed in different media known to a person skilled in the art (for example RPMI, IMDM), supplemented, inter alia, with serum and amino acids. The culture of the cells is carried out under sterile conditions, preferably at 37° C., as illustrated in the examples. It may be performed in culture plates, or preferably in teflon bags.

In a preferred embodiment, the cells contained in the composition of the invention have been obtained by cultivating PBMCs under suitable conditions permitting their differentiation. Human blood monocyte differentiation into macrophages can for example be induced in vitro using three different methods, namely by culturing PBMCs in 1) human serum (HS), 2) fetal bovine serum (FBS) with granulocyte-macrophage colony-stimulating factor (GM-CSF) or 3) FBS with macrophage colony-stimulating factor (M-CSF).

In a particular embodiment, the transduction of the purified monocytes from PBMC cells with the recombinant nucleic acids is performed ex vivo, then the transduced cells are differentiated/cultured into macrophages ex vivo. In this embodiment, the cell composition of the invention contains differentiated macrophages overexpressing the p21 protein.

In another particular embodiment, the recombinant nucleic acids of the invention have been transduced in the cells once they have been differentiated/cultured into macrophages ex vivo. In this embodiment, the cell composition of the invention also contains differentiated macrophages overexpressing the p21 protein, but the differentiation of the cells into macrophages has been performed prior to the transduction with the recombinant nucleic acids of the invention.

In another particular embodiment, the recombinant nucleic acids of the invention have been transduced in the cells at their monocytic stage, ex vivo. Then the cells are administered to the subject where their differentiation into macrophages occurs. In this embodiment, the cell composition of the invention contains undifferentiated monocytes overexpressing the p21 protein.

In another particular embodiment, it is possible to administer the recombinant nucleic acid in vivo in order to have the circulating macrophages transfected in situ.

As disclosed herein, the terms "in vitro" and "ex vivo" are equivalent and refer to studies or experiments that are performed using biological components (e.g. cells or population of cells) that have been isolated from their usual host organisms (e.g. animals or humans). In contrast, the terms "in vivo" or "in situ" refer to studies that are conducted on whole living organisms (e.g., humans), after administration of the composition of the invention in a living subject.

In another embodiment, the cell composition of the invention contains purified monocytes from PBMCs that have been transformed ex vivo, but have not been differentiated ex vivo into macrophages. Their differentiation will occur in vivo, in the host. In this case, the compositions of the invention possess more than 80% of monocytes or, more preferably more than 90% of monocytes, still more preferably more than 99% of monocytes. This means that the cell composition of the invention contains very few other cells, if any.

The monocytes purified from PBMCs contained within the cell composition of the invention are monocyte cells that have been recovered from the peripheral blood of an individual by conventional means. These monocytes purified from PBMCs are positive for the markers: CD14, CD11b and CD16 but negative for the markers CD56 (which is a marker of NK cells), CD3 (marker of T cells) and CD20 (marker of B cells). Preferably, the cell composition of the invention contains more than 90%, preferably more than 95% and ideally more than 99% of such cells. The presence of these markers can be assessed by any conventional means, e.g., by cytometry (FACS).

Macrophages differentiated in the tissues after the intravenous injections of the cell composition of the invention are monocyte-derived cells that are positive for the markers: CD14, CD11b, CD71, CD163 and CD206, but negative for the markers CD56 (which is a marker of NK cells), CD3 (marker of T cells) and CD20 (marker of B cells). Preferably, the cell composition of the invention contains more than 90%, preferably more than 95% and ideally more than 99% of such cells. The presence of these markers can be assessed by any conventional means, e.g., by cytometry (FACS).

The transformation of the cells to be included in the composition of the invention with the recombinant nucleic acid of the invention is to be performed in a sterile medium, under conditions adjusted by a person skilled in the art. Notably, the multiplicity of infection has to be adjusted in accordance with the vector used. One example with a SIV virus is given in the examples below.

When a lentiviral vector is used, the cells to be included in the composition of the invention are for example contacted with 50 to 250 pfu per cell of purified virus, and more preferably 50 to 100 pfu/cell. Depending on the transformation conditions, the percentage of cells modified by insertion of the recombinant nucleic acid can vary from 30 to 95%.

The modified cells thereby obtained may then be packaged for the purpose of immediate use, and/or stored for the purpose of subsequent use. For an immediate readministration, the cells are generally suspended in a phosphate buffer or in physiological saline at a concentration varying from $30 \times 10^6$ to $10^9$ cells per dose. For their storage, the cells may be frozen, preferably in the presence of preservatives such as glycerol, DMSO, and the like.

The cells transformed ex vivo according to the invention, especially by using the recombinant viral vector disclosed above, are a tool of choice for the preparation of a pharmaceutical composition, in particular of a composition intended to strengthen a patient's immune and haematopoietic system.

The cells of the composition of the invention can originate from the patient himself (the composition therefore contains autologous cells) or from a donor (the composition therefore contains allogeneic cells). For allogeneic cells, HLA compatibility and matching between the donor and the patient receiving the cells is required.

The pharmaceutical composition contains, as active principle, the transformed cells described above. It moreover contains a pharmaceutically acceptable excipient.

The term "pharmaceutically acceptable excipient" means an excipient that is useful in preparing a pharmaceutical composition that is generally safe, non-toxic, and desirable, and includes excipients that are acceptable for veterinary use as well as for human pharmaceutical use. Such excipients can be solid, liquid, semisolid, or, in the case of an aerosol composition, gaseous. Compositions for the treatment of cancer can usually be administered by parenteral, topical, intravenous, intratumoral, oral, subcutaneous, intraarterial, intracranial, intraperitoneal, intranasal or intramuscular means. A typical route of administration is intravenous or intratumoral, although other routes can be equally effective.

For intravenous administration, the composition of the invention will be under liquid form. It will thus contain, apart from the cells, a pharmaceutically-acceptable diluent that does not affect the biological activity of the cells of the invention. Example of such diluents are physiological phosphate-buffered saline, Ringer's solutions, dextrose solution, and Hank's solution. In addition, the pharmaceutical composition or formulation may also include other carriers, adjuvants, or nontoxic, nontherapeutic, nonimmunogenic stabilizers and the like.

In a preferred embodiment, the composition of the invention is under a liquid form.

The pharmaceutical compositions of the invention can be administered alone or combined with another pharmaceutical composition or another active principle. In particular, the pharmaceutical compositions of the invention can contain the cell compositions of the invention as well as another active principle, combined in the same container.

This active principle can be for example a chemotherapeutic agent. Exemplary chemotherapeutic agents include, but are not limited to, aldesleukin, altretamine, amifostine, asparaginase, bleomycin, capecitabine, carboplatin, carmustine, cladribine, cisapride, cisplatin, cyclophosphamide, cytarabine, dacarbazine (DTIC), dactinomycin, docetaxel, doxorubicin, dronabinol, duocarmycin, etoposide, filgrastim, fludarabine, fluorouracil, gemcitabine, granisetron, hydroxyurea, idarubicin, ifosfamide, interferon alpha, irinotecan, lansoprazole, levamisole, leucovorin, megestrol, mesna, methotrexate, metoclopramide, mitomycin, mitotane, mitoxantrone, omeprazole, ondansetron, paclitaxel (Taxol™), pilocarpine, prochloroperazine, rituximab, saproin, tamoxifen, taxol, topotecan hydrochloride, trastuzumab, vinblastine, vincristine and vinorelbine tartrate.

As used herein, the term "combined" does not imply that the cells of the invention and the other active principle are necessarily administered simultaneously. It also extends to any use or presentation involving their administration at different time intervals, or in separate containers.

In another embodiment, the cell composition of the invention is combined with a chemotherapeutic agent for example as defined above.

In another embodiment, the cell composition of the invention is combined with (or contains) an effective dose of an agent that increases patient hematocrit, for example erythropoietin stimulating agents (ESA). Such agents are known and used in the art, including, for example, Aranesp® (darbepoetin alfa), Epogen®NF/Procrit®NF (epoetin alfa), Omontys® (peginesatide), Procrit®, etc.

Other combination therapies include administration with cell-specific antibodies, for example antibodies selective for tumor cell markers, radiation, surgery, and/or hormone deprivation.

Therefore, the cell composition of the invention is combined with (or contains) an effective dose of said cell-specific antibodies.

A number of antibodies are currently in clinical use for the treatment of cancer, and others are in varying stages of clinical development. For example, there are a number of antigens and corresponding monoclonal antibodies for the treatment of B cell malignancies. One target antigen is CD20. Rituximab is a chimeric unconjugated monoclonal antibody directed at the CD20 antigen. CD20 has an important functional role in B cell activation, proliferation, and differentiation. The CD52 antigen is targeted by the monoclonal antibody alemtuzumab, which is indicated for treatment of chronic lymphocytic leukemia. CD22 is targeted by a number of antibodies, and has recently demonstrated efficacy combined with toxin in chemotherapy-resistant hairy cell leukemia.

Two new monoclonal antibodies targeting CD20, tositumomab and ibritumomab, have been submitted to the Food and Drug Administration (FDA). These antibodies are conjugated with radioisotopes. Alemtuzumab (Campath) is used in the treatment of chronic lymphocytic leukemia; Gemtuzumab (Mylotarg) finds use in the treatment of acute myelogenous leukemia; Ibritumomab (Zevalin) finds use in the treatment of non-Hodgkin's lymphoma; Panitumumab (Vectibix) finds use in the treatment of colon cancer.

Angiogenesis inhibitors can also be combined with (or contained in) the compositions of the invention.

In another embodiment, the cell composition of the invention is combined with (or contains) an effective dose of an immune checkpoint modulator, in particular of an immune checkpoint inhibitor (ICI).

"Immune checkpoint inhibitors" (ICI) include anti-PD1 antibodies (such as Nivolumab or Pembrolizumab or Pidilizumab), anti-PD-L1 antibodies (such as Atezolizumab or Durvalumab), anti-CTLA-4 antibodies (such as Ipilimumab or Tremelimumab) and anti-PD-L2 antibodies.

"Concomitant administration" of said active principle with the pharmaceutical composition of the present invention means administration with the recombinant cells at such a time that both the active principle and the composition of the present invention will have a therapeutic effect. Such concomitant administration may involve concurrent (i.e. at the same time), prior, or subsequent administration of the active principle with respect to the administration of a compound of the invention. A person of ordinary skill in the art would have no difficulty determining the appropriate timing, sequence and dosages of administration for particular drugs and compositions of the present invention.

The in vivo delivery of the cell composition of the invention, containing the obtained p21-expressing monocytes, in a subject in need thereof, is herein proposed as a simple and effective way of treating cancer, specifically leukemia.

Usually, the said subject is a human, but nonhuman mammals may also be treated, e.g. companion animals such as dogs, cats, horses, etc., laboratory mammals such as rabbits, mice, rats, etc., and the like.

A "subject in need thereof", as herein meant, is therefore a mammal, preferably a human being, that is suffering from cancer. Said cancer can be a liquid or a solid cancer such as, without limitation, a lymphoma, a leukemia, a carcinoma, a melanoma, a glioblastoma, a sarcoma, a myeloma, colon rectal tumours, etc. as primary or metastatic cancers. In a particular embodiment, said "subject in need thereof" is a human or another mammal suffering from leukemia.

The present invention encompasses treating methods in which the cell composition of the invention is administered to said subject in need thereof by injection, preferably by intravenous injection. A systemic injection may be also carried out by perfusion. These injections are harmless for the treated subject. The intravenous administration of the cell composition of the invention is able to increase the in vivo phagocytosis of the tumor cells present in the blood of the subject, thereby reducing the amount of tumor cells in said subject.

A particular treatment method according to the invention comprises:
1. Withdrawal and isolation of monocytes or their precursors or pluripotent stem cells from blood or bone marrow or umbilical cord, from the subject in need thereof or from an healthy donor,
2. Culturing of these cells as disclosed above, so as to obtain/isolate a monocyte population,
3. Transformation of these cells with the recombinant nucleic acid as defined above,
4. Optionally, packaging and/or storage of the cells thereby obtained, and then
5. Their administration to the patient.

The treatment of the present invention affords many advantages relative to other treatments in adoptive immunotherapy with LAK, TIL or NK (natural killers), such as, for example, the absence of toxic mediators released by the cells, the fact that the ratio of effector to target cells for the cytotoxicity is lower than in other treatments, and the fact that it does not necessitate the simultaneous injection of cytokine such as IL-2, the side effects of which are deleterious. Furthermore, it makes it possible to infect only a defined and controlled cell population, it enables the multiplicity of infection (number of viral particles per cell) to be chosen, it enables the tissues to be reached irreversibly from the blood circulation, and it makes it possible to turn to good account the central role of the macrophages in the body, both by their antitumour or anti-infectious activity and in their activity of stimulation or regulation of the immune system, as explained above. Besides the proinflammatory reprogramming of PrCR+ macrophages enhances the innate and adaptive anti-cancer immune response, which in turn establishes durable anti-tumour growth microenvironment. In addition, and taking account of the considerable longevity of macrophages, a handicapping repetition of treatments for the patient could be avoided.

The present invention hence affords new possibilities of more effective treatment which are less demanding for the patient, less expensive and more reproducible.

As used herein, the terms "treat", "treating", "treatment", and the like refer to reducing or ameliorating the symptoms of a disorder (e.g., leukemia), and/or symptoms associated therewith. It will be appreciated that, although not precluded, treating a disorder or condition does not require that the disorder, condition or symptoms associated therewith be completely eliminated.

Effective doses of the therapeutic entity of the present invention, e.g. for the treatment of cancer, vary depending upon many different factors, including means of administration, target site, physiological state of the patient, whether the patient is human or an animal, other medications administered, and whether treatment is prophylactic or therapeutic. Treatment dosages can be titrated to optimize safety and efficacy.

For prophylactic applications, pharmaceutical compositions or medicaments are administered to a patient susceptible to, or otherwise at risk of disease in an amount sufficient to eliminate or reduce the risk, lessen the severity, or delay the outset of the disease, including biochemical, histologic and/or behavioral symptoms of the disease, its complications and intermediate pathological phenotypes presenting during development of the disease. In these prophylactic applications, a relatively low dosage may be administered at relatively infrequent intervals over a long period of time. Some patients continue to receive treatment for the rest of their lives.

Conversely, in therapeutic applications, a relatively high dosage ($50 \times 10^6$ monocytes per injection dose per patient) at relatively short intervals (typically each week) is sometimes required until progression of the disease is reduced or terminated, and preferably until the patient shows partial or complete amelioration of symptoms of disease.

FIGURE LEGENDS

EXAMPLES

Figure 1:
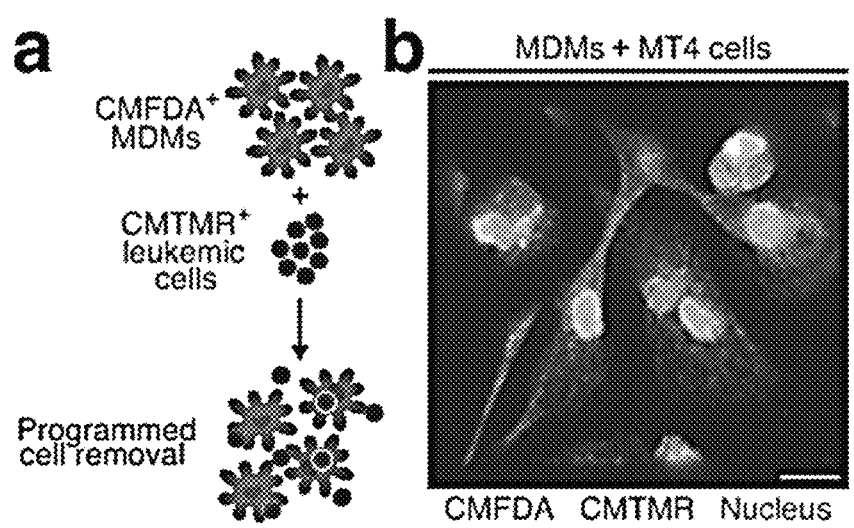
FIG. 1 shows that p21-dependent PrCR triggers pro-inflammatory reprograming of macrophages (FIGS. 1a to k) and favors leukemia regression (FIGS. 1l to r).

The examples given below are not limiting but are an illustration of the feasibility of the expression of the p21 protein into the macrophages, and of their therapeutic value in vivo.

1. Material and Methods

Culture of Primary Macrophages with Leukemic Cell Lines

Monocytes derived macrophages (MDM) were obtained through the differentiation of monocytes from buffy coats into macrophages. Buffy coats from healthy donors were obtained through the French blood bank (Etablissement Francais du sang (EFS)) as part of EFS-INSERM Convention in accordance with French law. Monocytes were first separated from peripheral blood mononuclear cells (PBMCs) by adherence to the plastic and then cultured for 6 to 7 days in hydrophobic Teflon dishes (Lumox; Duthsher) in macrophages medium (RPMI 1640 supplemented with 200 mM L-glutamine, 100 U of penicillin, 100 µg streptomycin, 10 mM HEPES, 10 mM sodium pyruvate, 50 µM β-mercaptoethanol, 1% minimum essential medium vitamins, 1% non-essential amino acids) containing 15% of heat inactivated human serum AB. MDMs were then harvested and suspended in macrophage medium containing 10% of heat inactivated fetal bovine serum (FBS). MDMs obtained with this method are 91 to 96% CD14 positive expressing the differentiation markers (C11b and CD71) and the M2 macrophage polarization markers (CD163 and CD206) when checked by Flow cytometer. The purity of MDMs was also controlled by the negative staining for CD56 (NK cells), CD3 (T cells) and CD20 (B cells). The primary blood lymphocytes (PBLs) were isolated from the non-adherent PBMCs fraction using T cells negative selection kit (STEM CELL). Lymphocytes obtained by this method were 90 to 97% CD3 expressing T cells and were cultured in RPMI medium containing 10% FBS. The differentiated MDMs ($0.125 \times 10^6$) and the viable leukemic cells ($0.125 \times 10^6$) (Jurkat, MT4, CEM, THP1, HEL-5320, K562 or $CD34^+$ acute myeloid leukaemia blasts ($CD34^+AML$)) were pre-labelled respectively with cell tracker green (CMFDA) or red (CMTMR) for one hour. The PBLs obtained from healthy donors were used as controls. After extensive washings, MDMs and leukemic cells were co-cultured in 8× well chamber slides in macrophage medium supplemented with 10% FBS in the presence or absence of ZVAD-fmk pan-caspase inhibitor (100 μM) in 250 μl total volume for 8 hours. After extensive washings non-engulfed leukemic cells by macrophages were removed and macrophages were fixed (with 2% PFA) before confocal microscopy analysis. The percentage of PrCR+ macrophages was determined by the number macrophages ($CMFDA^+$) that internalized leukemic cells ($CMTMR^+$) on the total number of macrophages. Time lapse video microscopy were performed directly after the co-culture of primary macrophages with leukemic cells. The co-culture of primary macrophages that were silenced for the cyclin-dependent kinase inhibitor p21 with leukemic cells were performed at 24 hours after p21 silencing of MDMs. Differentiated MDMs were silenced for p21 gene through the transfection of 50 nM of the siRNA against the p21 gene (siRNA p21) which is the on-target plus siRNA p21 n.12 (SEQ ID NO:6: 5' AGA CCA GCA UGA CAG AUU U 3') obtained from Dharmacon. The siRNAs transfection was performed using INTERFERin kits (Polyplus Transfection). Equal amounts of on-target plus non-targeting siRNAs (siCo.) (Dharmacon) were added to control MDMs. The efficiency of p21 gene knockdown in MDMs was evaluated by western blot at 24 hours after silencing that corresponded to the time of co-culture with leukemic cells. The sorting of $PrCR^+$ macrophages by flow cytometer was performed after two hours of co-culture of macrophages with leukemic cells. Sorted $PrCR^+$ macrophages ($CMFDA^+CMTMR^+$) and the $PrCR^-$ macrophages ($CMFDA^+$) were then cultured for further 96 hours before the analysis of the scavenger receptor CD163 membrane expression (by flow cytometer), the IRF5 expression (by western blot) and the analysis of cytokine secretion in the cell supernatant (by the cytokine microarray profiling).

p21-Overexpressing Engineered Human Primary Monocytes

Purified primary monocytes ($15 \times 10^6$) were transduced with 150 μg CAp24 of a HIV-1-based Self Inactivated (SIN) lentiviral vector encoding to p21 gene under SFFVp promoter (AIP-p21) and the Viral Like Particles (VLPs) containing SIVmac-VPX to induce the degradation of the myeloid restriction factor of lentiviral infections SAMHD1 protein. The control monocytes were transduced with equal amounts of AIP vectors and VLPs-SIV-mac-VPX. The transductions were performed by 1-hour spinoculation (at 1200 g, 22 C) and one hour at 37 C. The transduced monocytes ($15 \times 10^6$) were then labelled with the Cell Trace CFSE dye for 1 hour and extensively washed prior to their intravenous injection to 1 Gray (1 Gy) irradiated male or female NSG mouse (6 to 8 weeks old) at 24 hours after X-Ray irradiation. MT4 $mCherry^+$ T cells ($1 \times 10^6$) were intravenously injected at 7 days after p21-monocyte transfer. The overall survival of the mice was monitored, until 15 days after leukemic engraftment when some mice were sacrificed to monitor the presence of PrCR+ macrophages ($CFSE^+mCherry^+$) in the bone marrow by confocal microscopy. The pro-inflammatory activation of PrCR+ macrophages was determined by flow cytometer analysis of CD163 membrane expression on the $PrCR^+$ macrophages ($CFSE^+mCherry^+$) and $PrCR^-$ macrophages (CFSE) sorted from the spleen and bone marrow of the scarified mice.

During the in vivo set up model, the differentiation of the monocytes into macrophages in the NSG mice model was verified by purifying, 7 days after the monocyte transfer, the $CFSE^+$ cells from bone marrow, spleen, and blood and by evaluating the expressions of the differentiation markers (CD71, CD163 and CD14) with respect to the autologous in vitro differentiated macrophages. Some of the AIP-p21 transduced monocytes were cultured in parallel in vitro to evaluate the upregulation of p21 expression by western blot 7 days after differentiation.

Mouse Treatment Studies

NSG mice were bred and maintained under pathogen free conditions at the animal facility of Gustave Roussy Institute. Animal experiments were performed in accordance with guidelines established by the French Institutional Animal Committee. MT4 leukemic T cells ($1 \times 10^6$) that express stably mCherry fluorescent gene, through lentiviral vectors transductions and flow cytometer sorting for mCherry expression, were intravenously injected to female or male mouse (6-8 weeks old). The leukemic engraftment was evaluated until four weeks after injections through the presence of $mCherry^-MT4$ T cells in the bone marrow, spleen, liver and blood and trough the disease progression characterized by the loss of weight, the invasion of the bone marrow and the marked splenomegaly and the overall survival.

SIRPa cDNA Cloning

The cDNA expressing *Homo sapiens* SIRPa phagocytosis inhibitor was cloned in a HIV-1-based Self Inactivated (SIN) lentiviral vector (pRRLEF1-PGK-GFP) between the restriction sites MluI and NheI.

The sequence of hsSIRPa cDNA is indicated in SEQ ID NO:7.

Transduction of Monocytes with Lentiviral Vectors Expressing p21 and SIRPa

Purified primary monocytes ($10^7$) were transduced with 100 μg CAp24 of a HIV-1-based Self Inactivated (SIN) lentiviral vector encoding to p21 gene under SFFVp promoter (AIP-p21) and/or and 100 μg CAp24 of a HIV-1-based Self Inactivated (SIN) lentiviral vector encoding to SIRPa gene under EF1 promoter (PRRL-SIRPa) in the presence of Viral Like Particles (VLPs) containing SIVmac-VPX to induce the degradation of the myeloid restriction factor of lentiviral infections SAMHD1 protein. The control monocytes were transduced with equal amounts of AIP and/or PRRL vectors and VLPs-SIV-mac-VPX. The transductions were performed for three hours at 37° C. in the presence of polybrene (10 μg/ml). The transduced monocytes ($10^7$) were then labelled with the Cell Trace CFSE dye for 1 hour and extensively washed prior to their intravenous injection to 1 Gray irradiated male or female NSG mouse (6 to 8 weeks old) at 24 hours after X-Ray irradiation or in vitro differentiated into macrophages as described before in the main patent materials and methods.

2. Results

The present inventors investigated the molecular mechanisms by which macrophages may regulate PrCR. They assessed the phagocytosis, by primary anti-inflammatory pro-tumorigenic human monocyte-derived macrophages (MDMs) (labeled with green fluorescent cell tracker CMFDA) of a panel of diverse living leukemic cells (labeled with red fluorescent cell tracker CMTMR) (FIG. 1a).

Figure 1C:
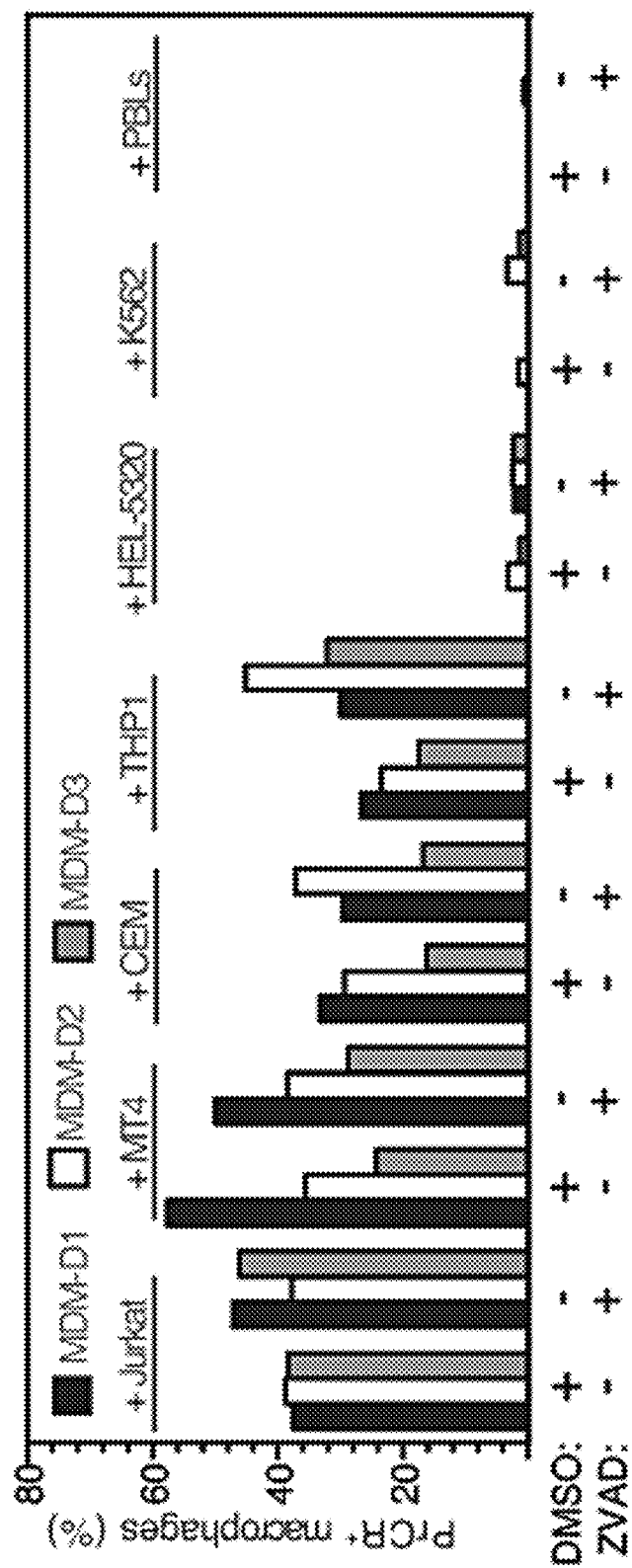
Figure 1:
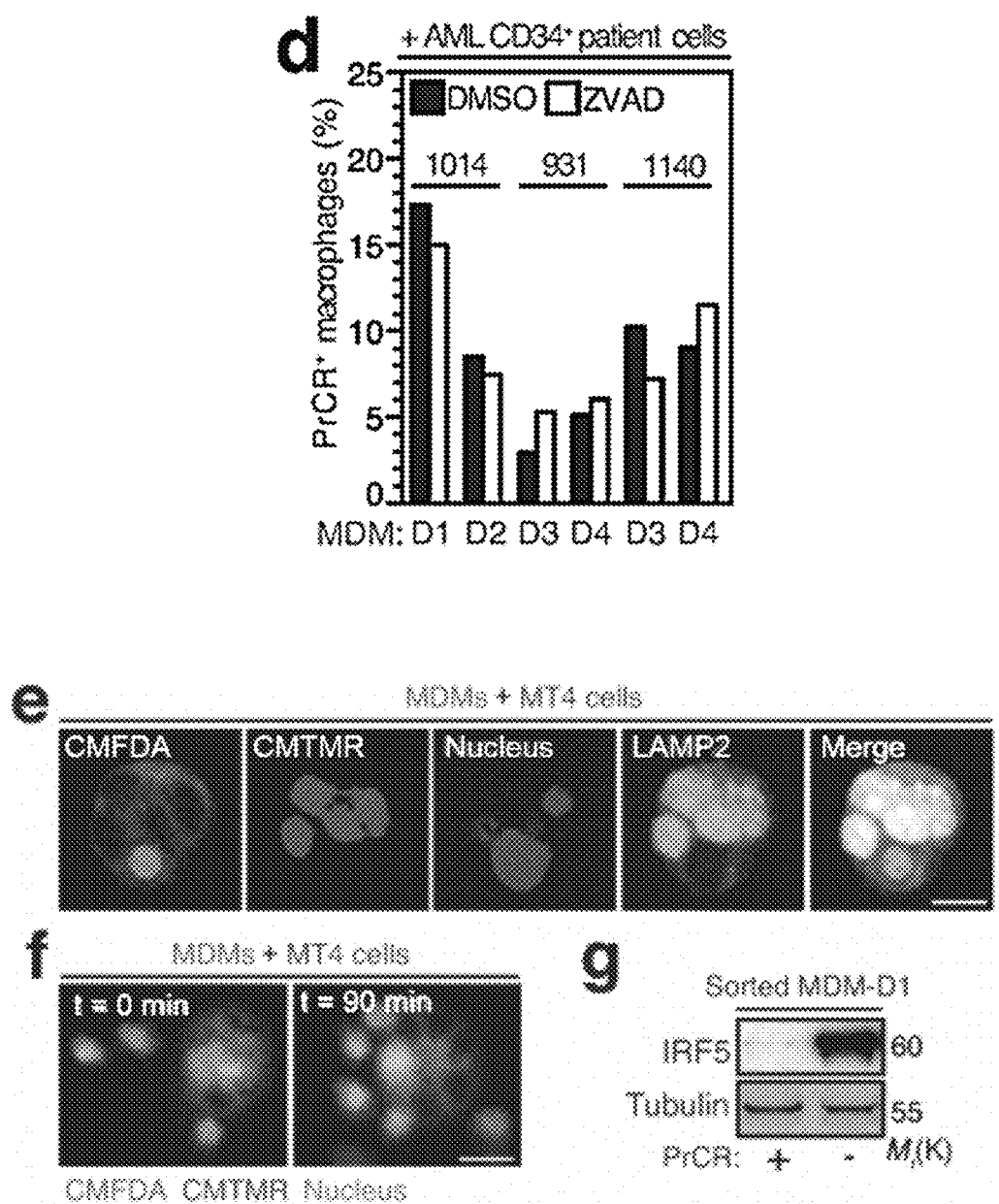
Figure 1:
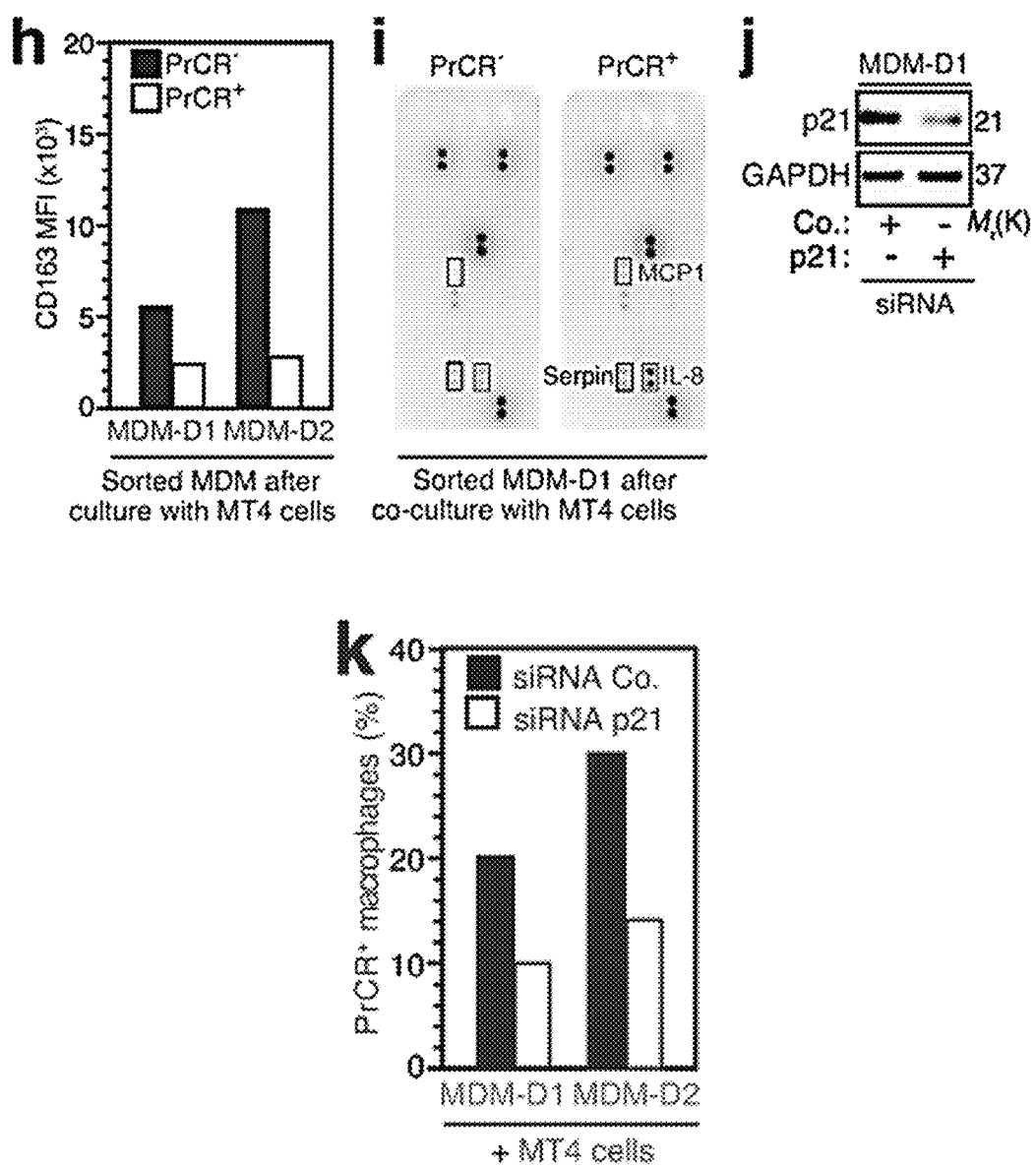
Figure 1:
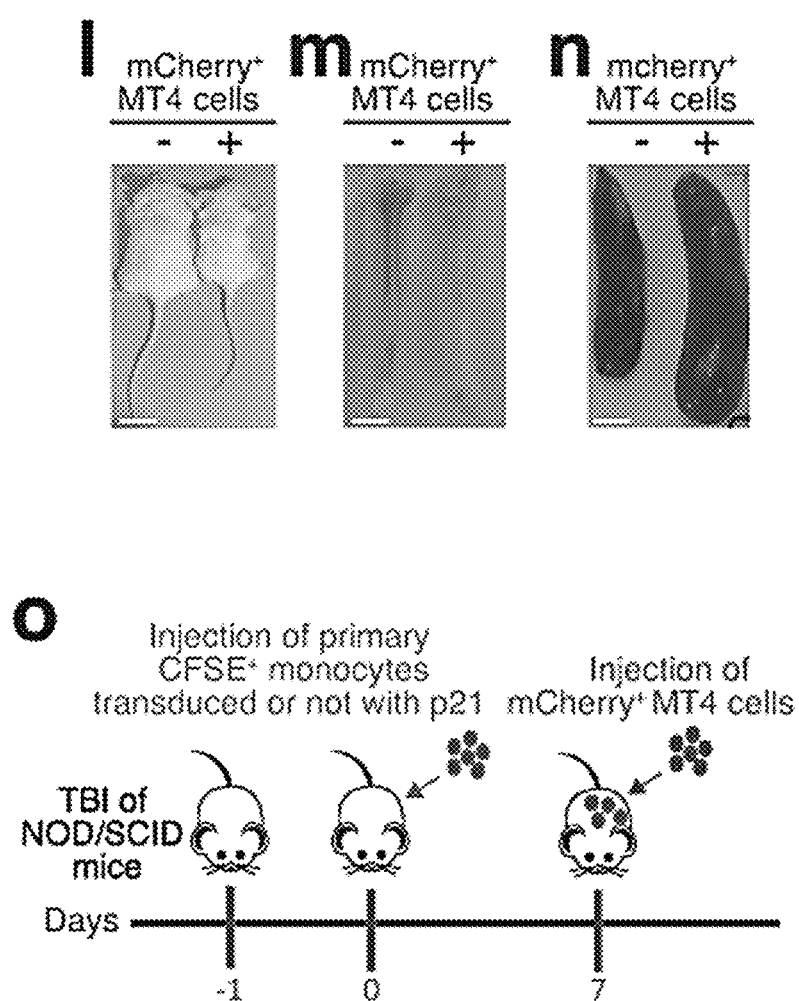
Figure 1:
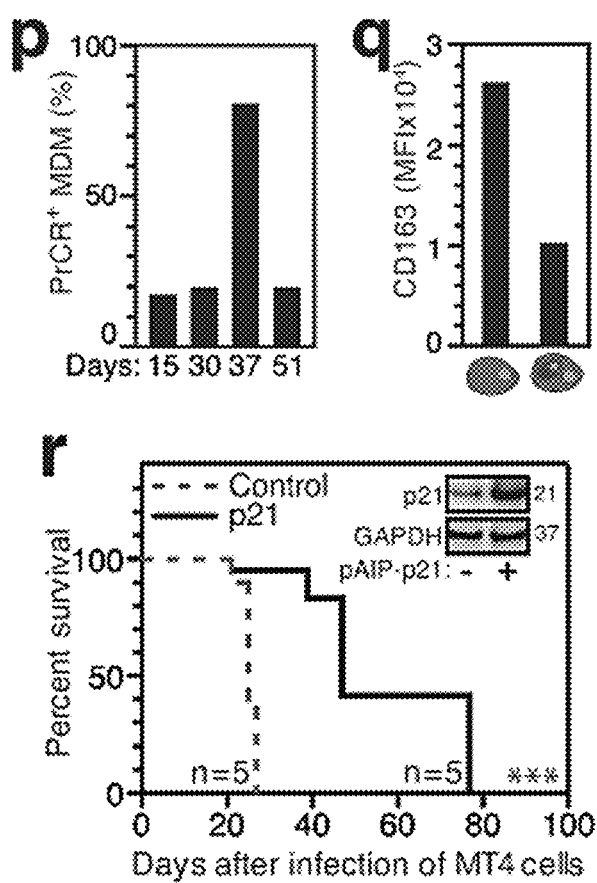

Using confocal microscopy, they observed that in absence of MIC inhibitors, phagocytosis of living tumor cells was already significantly increased during the co-cultures of human primary macrophages with acute T lymphoblasts (Jurkat, CEM or MT4 cells, FIGS. 1b and 1c), acute myeloid cells (THP1 cells, FIG. 1c), acute megakaryoblastic cells (UT-7 cells, not shown), erythroblasts (HEL-5320, FIG. 1c), chronic myeloid lymphoblasts (K562 cells, FIG. 1c) and primary transformed CD34+ blasts purified from blood of patients with acute myeloid leukemia (FIG. 1d), while living autologous or heterologous non-transformed peripheral blood lymphoblasts (PBLs) were not affected (FIG. 1c). The pan-caspase inhibitor (ZVAD) did not reduce the engulfment of target cells (FIG. 1c). These results indicate that macrophages may also spontaneously develop PrCR in absence of MIC blockade.

The inventors then observed that, once internalized, MT4 cells are rapidly degraded by lysosomes (FIGS. 1e and 1f). They also revealed that PrCR can induce the functional reprogramming of engulfing macrophages from an anti-inflammatory to pro-inflammatory phenotype (as revealed by the increased expression of IRF5 transcription factor (FIG. 1g), the decreased membrane expression of CD163 scavenger receptor (FIG. 1h) and the release of pro-inflammatory cytokines (such as MCP-1, Serpin and IL-8) (FIG. 1i) from cell-sorted engulfing "PrCR+" macrophages.

The inventors moreover showed that the cyclin-dependent kinase inhibitor p21, which is overexpressed in primary human macrophages, is a master regulator of PrCR. This has been revealed by the inhibition of the engulfment of living MT4 cells by p21-depleted human primary macrophages (FIGS. 1j and 1k). Altogether, these results demonstrated that p21 expression dictates the pro-inflammatory reprogramming of macrophages through the induction of PrCR.

The curative therapeutic potential of manipulating PrCR through the adoptive transfer of p21-overexpressing Engineered Human primary Monocytes (p21 EHM) was then appreciated. The biological effects of the adoptive transfer of p21 EHMs into NOD/SCID mice were determined before the implantation of HTLV-1 transformed MT4 cells. Control mice developed leukemia (as revealed by the weight loss (FIG. 1l), the bone marrow invasion (FIG. 1m) and the marked splenomegaly (FIG. 1n) of engrafted mice). After the transfer of CFSE-labeled p21 EHMs into engrafted mice, their differentiation was observed in vivo into macrophages (FIG. 1o and not shown) and the presence of MT4-engulfing macrophages was detected in the engrafted mice: in the bone marrow (FIG. 1p), in the liver and in the spleen (not shown).

It was also observed that MT4-engulfing macrophages underwent transition from an anti-inflammatory to a pro-inflammatory phenotype (as revealed decreased the membrane expression of CD163 and the increased secretion of IFNγ and IL-1β; FIG. 1q and not shown). Interestingly, p21EHM-based cell therapy led to the delay of disease progression in treated mice and increased significantly the overall survival (FIG. 1r).

Altogether, these data demonstrated that the adoptive transfer of p21 EHM represent a novel therapeutic strategy to treat hematological malignancies through macrophage PrCR induction.

Figure 2:
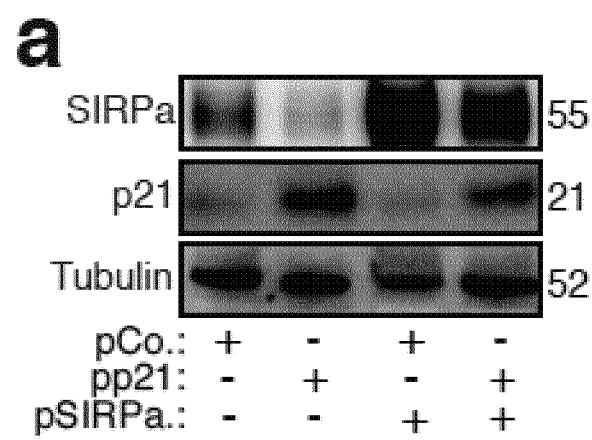
FIG. 2 shows that p21 dictates programmed cell removal of macrophages and leukemia regression through the modulation of SIRPa (FIGS. 2a and 2b) and confirms that p21 favors leukemia regression (FIGS. 2c and 2d).
Figure 2:
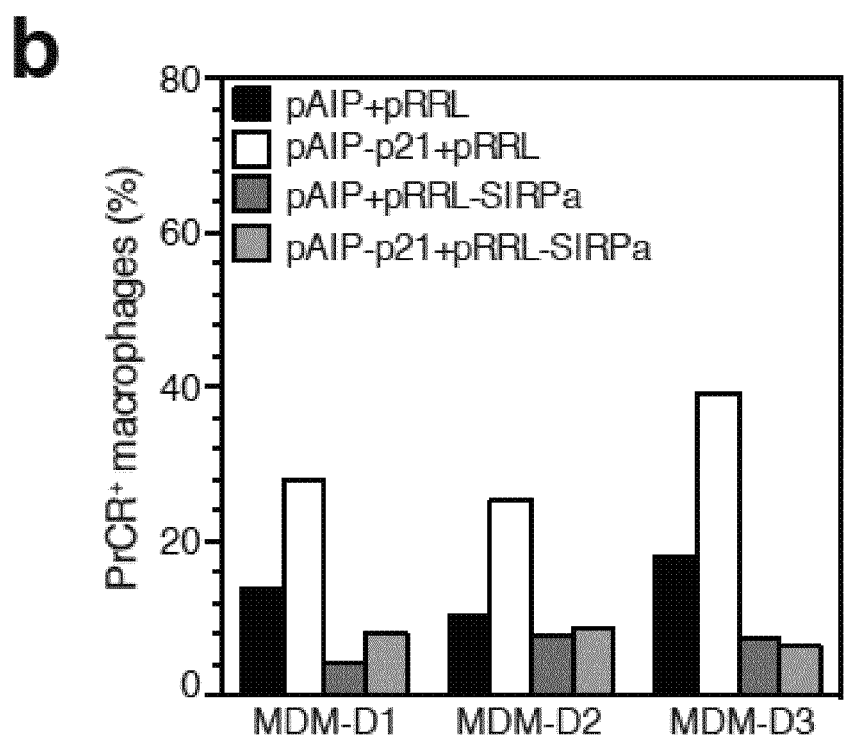
Figure 2:
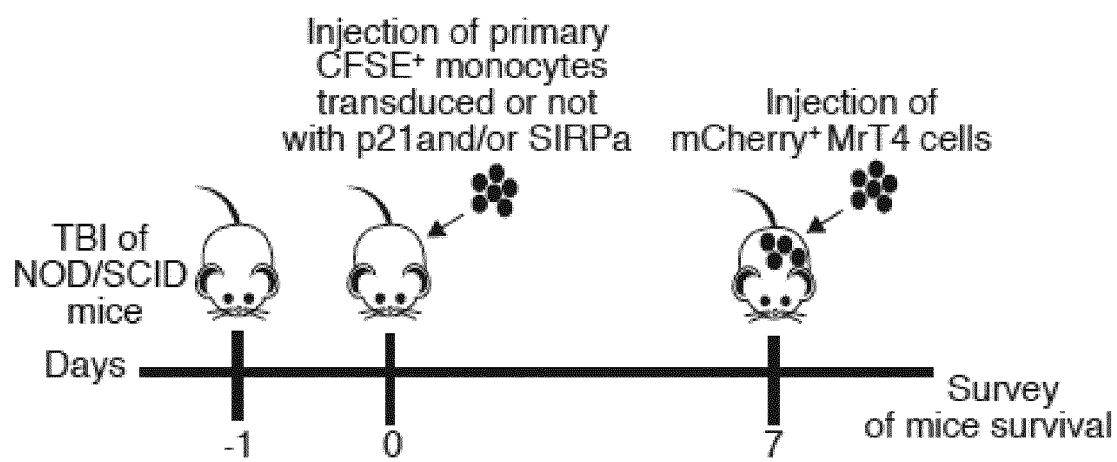
Figure 2:
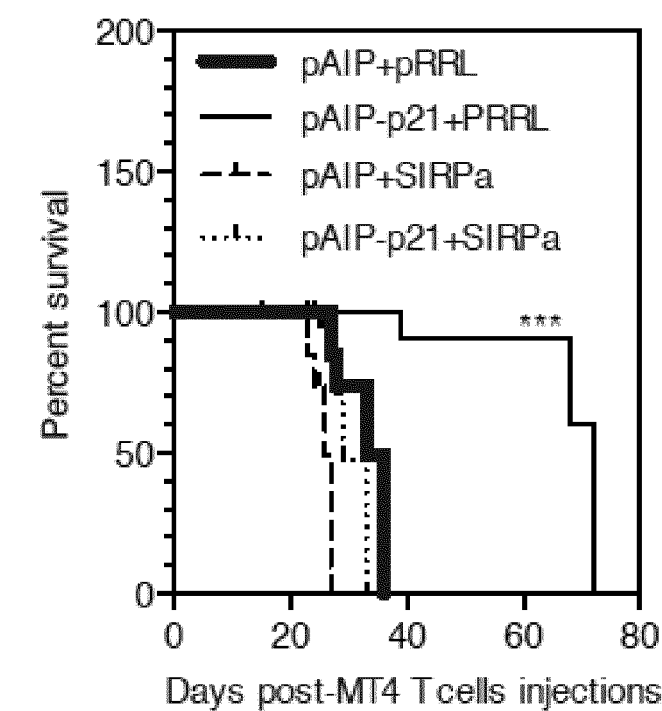

To further characterize the molecular link between p21 and programmed cell removal, the impact of p21 expression was determined on the expression of the phagocytosis inhibitor SIRPa. Primary human monocytes were simultaneously transduced with lentiviral vectors expressing p21 and/or SIRPa in combination or/not with their respective control empty vectors pCo. (pAIP and/or pRRL). A fraction of monocytes was differentiated in vitro into macrophages for seven days and p21 and SIRPa expressions were determined by western blot (FIG. 2a). The efficiency of transduction was validated in each condition. It was detected that the overexpression of p21 repressed SIRPa expression, thus revealing that p21 expression regulates negatively SIRPa expression (FIG. 2a). To determine the impact of these transduction on programmed cell removal, cocultures of transduced macrophages were then performed with leukemic MT4 cells that expressed mCherry fluorescent protein and the frequency of macrophages that engulfed mCherry+ MT4 cells (PrCR+ macrophages) was analyzed using fluorescence microscopy (FIG. 2b). It was observed that the increased expression of p21 and SIRPa enhanced and reduced the phagocytosis of mCherry+ MT4 cells, respectively. In addition, the increased expression of SIRPa in macrophages that were transduced for p21 inhibited this process, thus demonstrating that p21 dictates programmed cell removal of macrophages through the modulation of SIRPa expression. The impact of these modulations was then analyzed on leukemia progression. Transduced monocytes (shown in FIG. 2a) were adoptively transferred to NOD/SCID mice one week before the injection of mCherry+ MT4 cells (FIG. 2c) and the overall survival of the engrafted mice was analyzed (n=5 mice in each group) (FIG. 2d). P values were calculated using Mantel-Cox test and revealed statistical significance between analyzed groups (***p<0.001). Altogether, these results confirmed that the adoptive transfer of p21 overexpressing monocytes (p21 EHM) may delay leukemia progression through the modulation of SIRPa-dependent programmed cell removal of macrophages.

BIBLIOGRAPHIC REFERENCES

Advani R. et al., *N Engl J Med* (2018) November 1; 379(18):1711-1721
Andressen R. et al., *Cancer Res.* (1990) 50:7450
Arandjelovic S and Ravichandran K S, *Nat Immunol* (2015) September; 16(9):907-17
Aronovich E L et al., *Human. Molecular. Genetics* (2011) Vol. 20, Review Issue 1 R14-R20
Bartholeyns J et al., *Anticancer Res.* 11 (1991) 1201-1204
Berger G., *Gene Therapy* (2009) 16, pages 159-163
Chao M P et al., *Nat Rev Cancer* (2011) December 8; 12(1):58-67
Feng et al., *Nat Comm* (2018) August 10; 9(1):3194.
Haddada H. et al. *Biochem. Biophys. Res. Commun* (1993) September 30; 195(3):1174-83.
Jaiswal S., *Trends Immunol.* (2010) June; 31(6):212-9
Jaiswal et al., *Cell* (2009) July 23; 138(2):271-85
Leyva F. et al, *BMC biotechnology* (2011); 11: 13
Majeti et al., *Cell* (2009) July 23; 138(2):286-99
Neschadim A. et al. *Biol Blood Marrow Transplant.* 2007 December; 13(12):1407-16.
Pardoll D M., *Nat Rev Cancer* (2012) March 22; 12(4): 252-64.
Sharma S H et al, *Cell* (2015) April 9; 161(2):205-14
Singh G. et al, *F1000 research* 2015, 4:495
Weiskopf K, *Eur J Cancer* (2017) May; 76:100-109.

The invention claimed is:

1. A method for killing a cancer cell in a mammal suffering from cancer, comprising contacting the cancer cell in the mammal with a monocyte genetically modified to overexpress cyclin-dependent kinase inhibitor p21 protein, wherein the genetically modified monocyte comprises an exogenous nucleic acid coding for cyclin-dependent kinase inhibitor p21 protein.

2. A method for treating a mammal suffering from a lymphoid cancer or from a myeloid cancer or from a solid cancer, said method comprising administering to the mammal a pharmaceutical composition comprising genetically modified monocytes that overexpress cyclin-dependent kinase inhibitor p21 protein, and a pharmaceutically acceptable excipient, wherein the genetically modified monocytes comprise an exogenous nucleic acid coding for cyclin-dependent kinase inhibitor p21 protein.

3. The method of claim 2, wherein said lymphoid cancer is leukemia.

4. The method of claim 2, wherein said pharmaceutical composition comprises $50 \times 10^6$ monocytes per injection dose and is administered each week until progression of the disease is reduced.

5. The method of claim 2, wherein said mammal is a human.

6. The method of claim 2, further comprising administering an effective dose of an agent that increases haematocrit, of a chemotherapeutic agent, of a cell-specific antibody, or of an immune checkpoint inhibitor (ICI).

7. The method of claim 6, wherein said mammal is a human.

8. The method of claim 2, wherein said monocytes comprise a replication defective recombinant virus encoding cyclin-dependent kinase inhibitor p21 under control of regulatory elements permitting its expression.

9. The method of claim 2, wherein said monocytes comprise a replication defective recombinant lentivirus encoding cyclin-dependent kinase inhibitor p21 under control of regulatory elements permitting its expression.

10. The method of claim 2, wherein said monocytes comprise a HIV-1 based self inactivated (SIN) lentiviral vector encoding cyclin dependent kinase inhibitor p21 under control of regulatory elements permitting its expression.

11. The method of claim 2, wherein the composition is formulated in an intravenous injectable form or in a perfusion form.

12. The method of claim 2, wherein the composition contains $30 \times 10^6$ to $10^9$ of modified monocytes.

13. The method of claim 2, wherein said monocytes comprise a synthetic transposon system encoding cyclin-dependent kinase inhibitor p21 under control of regulatory elements permitting its expression.

14. The method of claim 2, wherein said p21 protein comprises an amino acid sequence that is at least 90% identical to SEQ ID NO:2.

15. The method of claim 2, wherein said monocytes comprise a replication defective recombinant virus comprising the nucleic acid according to SEQ ID NO:5.

16. The method of claim 2, wherein said monocytes comprise a replication defective recombinant virus comprising the nucleic acid according to SEQ ID NO:5 under control of a SFFV promoter.

* * * * *